United States Patent [19]
Wolff et al.

[11] Patent Number: 5,738,034
[45] Date of Patent: Apr. 14, 1998

[54] FAIRING SYSTEM FOR SUBSEA DRILLING RIGS AND METHOD FOR INSTALLATION AND REMOVAL

[75] Inventors: Christian V. Wolff, Houston; Drew A. Weathers, Katy, both of Tex.

[73] Assignee: Reading & Bates Development Co., Houston, Tex.

[21] Appl. No.: 735,682

[22] Filed: Oct. 23, 1996

[51] Int. Cl.$^6$ ............................................. F15D 1/10

[52] U.S. Cl. .................... 114/243; 166/367; 405/211; 414/795.6

[58] Field of Search ............. 114/243; 414/788.2, 414/795.6, 796.9, 796.4; 405/211, 224.2; 166/350, 359, 367; 175/7

[56] References Cited

U.S. PATENT DOCUMENTS 4,398,487  8/1983  Ortloff et al. .................... 114/243
4,474,129 10/1984  Watkins et al. ................... 114/243

*Primary Examiner*—Sherman Basinger
*Attorney, Agent, or Firm*—Pravel, Hewitt, Kimball & Krieger

[57] ABSTRACT

The present invention relates to an improved apparatus and method for minimizing vortex induced vibrations and hydrodynamic drag of a drilling riser. Vortex induced vibrations and hydrodynamic drag are minimized by installing on a drilling riser streamlined fairing sections. The fairing sections are installed on and removed from a riser through the use of one or more door panels on a rounded front portion that have a latch mechanism which can be easily opened and closed. The fairing sections are configured so they can nest one inside the other for easy storage. A tapered back or tail section of each fairing section has an attachment receptacle for engagement by a handling mechanism with a telescoping arm for grasping the fairing section. The handling mechanism is designed to move the fairing sections between a rack, where they are stored, and a position adjacent to the riser.

23 Claims, 3 Drawing Sheets

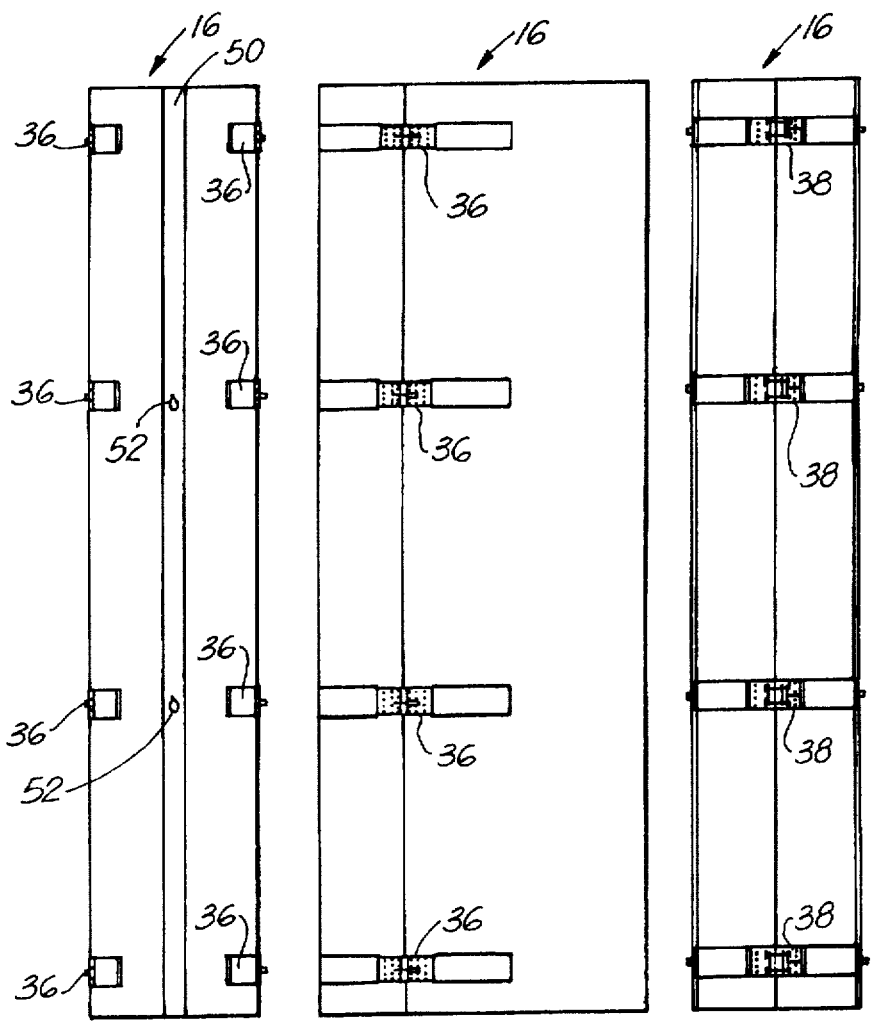
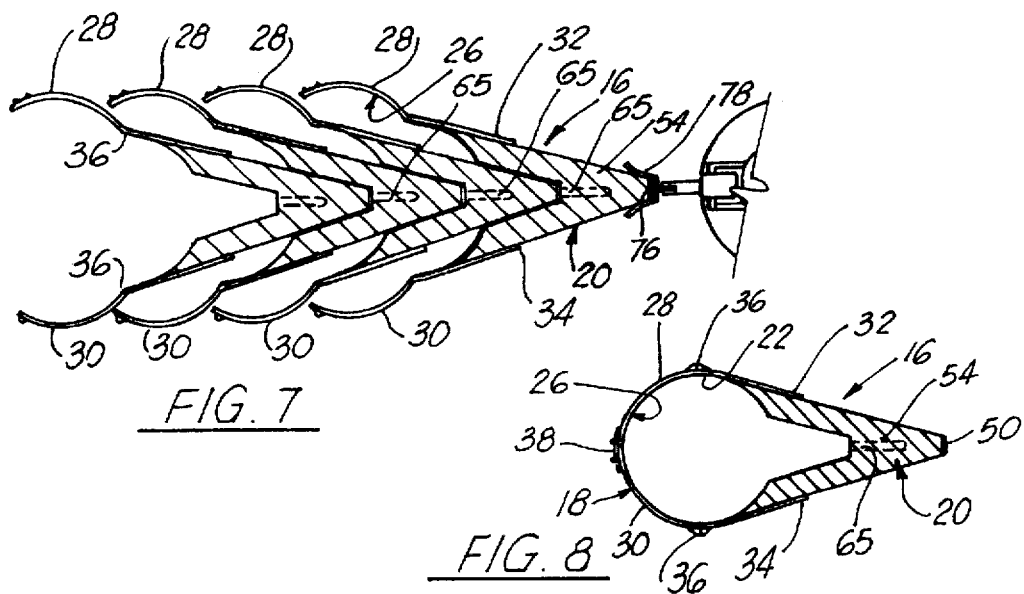

FAIRING SYSTEM FOR SUBSEA DRILLING RIGS AND METHOD FOR INSTALLATION AND REMOVAL

BACKGROUND OF THE INVENTION

1. Field of the Invention

The present invention relates to an apparatus and method for reducing vortex induced vibrations (VIV) and hydrodynamic drag that tend to overstress and damage riser pipes of marine drilling rigs during offshore drilling operations. More particularly, the present invention relates to an improved apparatus and method for minimizing VIV and hydrodynamic drag by providing a plurality of streamlined fairing sections that can be installed on a drilling riser.

The fairing sections are easily installed on and removed from a riser through the use of one or more door panels on a rounded front portion that have a latch mechanism which can easily be opened and closed. The fairing sections are configured so they can nest one-inside-the-other for easy storage on the deck of the rig. The tapered back or tail portion of each fairing section has an attachment receptacle for engagement by a handling mechanism with a telescoping arm for grasping the fairing section. The handling mechanism is designed to move the fairing sections between a rack, where the fairing sections are stored in an out-of-the-way location, and a position adjacent to the riser on which the fairing section is installed.

2. General Background

Offshore drilling operations encompass a multitude of subsea tools, equipment and operational procedures. One of the most significant operations is the servicing and deployment of the drilling riser and blow out preventer (BOP).

The drilling riser is the conduit for returning drilling fluids and cuttings from the well and for conveying well gas that may need to be diverted in well control operations. The drill string extends through the drilling riser and BOP.

The riser is made up of a number sections of large diameter steel tubes joined with special connectors. The riser also supports kill and choke lines, mud booster, and other ancillary lines that connect a marine drilling vessel to the undersea wellhead. The drilling riser is typically equipped with buoyancy modules (e.g., syntactic foam or air cans). It is usually tensioned at the top, and connected to the drilling vessel by way of a telescoping slip joint. The slip joint permits relative vertical movement of the drilling vessel versus the vertically stationary riser. Horizontal movement is facilitated by means of ball or flex joints at the top of the BOP, and at the top of the telescoping joint.

When deployed, the drilling riser is affected and stressed by its own weight, its top tension, the weight of the drilling fluid, the wave and current action in the water, and the horizontal excursions of the marine drilling vessel. It must be designed to safely withstand all of these forces.

In particular, wave and current actions cream relatively high drag forces and vortexes induced by water moving over and past the riser (VIV), that can over-stress and damage the riser pipe and result in excessive riser angles at top and bottom, which in extreme cases may create unsafe drilling conditions. Traditionally, risers are designed to withstand these forces through structural adaptation, which often leads to very high costs. Alternatively, drilling operations may be curtailed when wave and current conditions are excessive.

In a limited way, so called "strakes" (helically wound appendages strapped to the riser) have been used to counter VIV. Airfoil shaped fairings have been known to greatly reduce drag (by as much as 75%), and to suppress VIV as well. Their use has not been widely accepted because of the difficult and time consuming procedures required to install and or remove the fairings during the deployment/retrieval operation.

Several fairing systems have been patented that are directed to preventing vortex-induced vibrations in subsea risers. An early patent is U.S. Pat. No. 3,352,118, which describes a double wall sleeve or sack having permeable elastic webbing connecting the walls to each other surrounds a body immersed in water to reduce frictional drag of such body when it is subjected to wave and/or current forces by streamlining the outer contour of the body. A constant volume fluid is contained between the two walls. Under the action of drag forces, the outer wall deforms and contracts toward the leading edge of the body and elongates from the trailing edge. There is no special provision for quick installation or removal of the fairing sections, nor for storage or handling on a drilling rig.

U.S. Pat. No. 3,410,096 describes a streamlined riser pipe which incorporates an assembly for minimizing current-induced transverse vibrations and drag forces when critically aligned with respect to the current. The assembly includes several streamlined sections attached to opposite sides of the riser along its length. One of the streamlined sections has an externally channeled portion for mounting a choke line. Another streamlined section can be channeled to receive a hose bundle. The fairing is in segments that are not capable of compact storage. Also, there is no special provision for installation, removal or storage in the drilling rig.

U.S. Pat. No. 4,171,674 describes a fairing for pipes or other substantially rigid structures. The pipe may be immersed in a fluid medium, usually fresh water or sea water. The fairing is formed as a shell having a nose portion in which the pipe—or a pipe bundle—is accommodated and a tail portion. At least the tail portion of the fairing has a plurality of upstanding ribs which extend at least from the forward portion of the tail to its rear portion. The cross-sectional dimensions through the upstanding ribs are different in absolute terms than the cross-sectional dimensions taken through the alternating tail portions between the ribs, but the aspect ratios of length to breadth of each of the cross-sections are similar. A pair of stabilizer plates may be secured across the outer surfaces of the upstanding rib portions near the rearward ends. Apertures may be formed in trailing fin portions which extend rearwardly from behind the alternating tail portions, with at least a portion of each of the apertures being located between the stabilizer plates. However, there are no provisions for quick installation or removal, nor for storage on the drilling vessel.

U.S. Pat. No. 4,347,029 describes an apparatus for use on an ocean mining surface vessel, for transporting links of pipe from a horizontal storage rack to a main dredge line hoist, which vertically supports connected lengths of pipe from the ocean surface to the ocean floor. U.S. Pat. No. 4,365,787, to the same inventor as U.S. Pat. No. 4,347,029, describes a system for supporting a long, heavy dredge pipe string from a moving surface vessel, with a minimum of stress being applied to the pipe. The system comprises a gimbaled platform, supported over a central well through a vessel by two horizontal axes perpendicular to each other. A carriage is supported from the platform on hydraulic piston rods. Pipe string support plates are movably secured to facing surfaces on the carriage and platform, arranged about central openings to permit close-coupling of the two sets of support plates when transferring the pipe string. There is also provided a pair of lateral support members for the pipe string at the bottom of the well. Neither of these patents addresses the problem of quick installation or removal of fairings, or a shape that allows convenient and compact storage on the deck of a drilling vessel.

A riser pipe fairing is described in U.S. Pat. No. 4,474,129, which is constructed of syntactic foam and is said to be compatible with existing systems. The fairing is designed to be removably secured to riser buoyancy modules. The fairing has fluid flow characteristics. A transverse panel prevents a nesting of one fairing in another. However, there are no considerations for ease of installation, removal, handling or storage.

U.S. Pat. No. 4,398,487 describes a fairing for elongated elements for reducing current-induced stresses on the elongated element. The fairing has a body that is streamlined, with a nose portion in which the elongated element is accommodated, and a tail portion. The body has a bearing connected to it to provide bearing engagement with the elongated element. A biasing device interconnected with the bearing accommodates variations in the outer surface of the elongated element to maintain the fairing's longitudinal axis substantially parallel to the longitudinal axis of the elongated element as the fairing rotates around the elongated element. The fairing is particularly adapted for mounting on a marine drilling riser having flotation modules. A transverse panel prevents nesting of one fairing inside another. Ease of installation and removal is not addressed, nor is any special way of storage and handling on the vessel.

U.S. Pat. No. 5,410,979 describes a fairing for suppression of vortex-induced vibration of a marine tubular, the tubular having a circular cross section and a centerline that is normal to the circular cross section. The fairing has shaped sides that extend essentially tangentially from the outer surface of the tubular toward a point that is about a distance equal to the outside diameter of the tubular or less from the centerline of the tubular. The fairing is fixed to the tubular so that the fairing cannot rotate around the tubular. The fairing is bolted to the pipe, so that the fairing cannot rotate about the tubular member on which it is mounted. The sections of fairing are not designed for convenient or compact storage. No special considerations are made for installation, removal, or handling.

U.S. Pat. No. 5,421,412, describes a method that is said to reduce vortex-induced vibrations in subsea risers. A flexible fairing is provided surrounding the riser which is fixed to the riser. The flexible fairing is provided to reduce displacements caused by vortex induced vibrations regardless of the direction of the current. The device is formed as a flexible shell, such as vinyl, filled with a fluid. No installation, removal, handling or storage issues are provided.

There is a need for a fairing system with fairing sections that are easily and quickly installed on and removed from marine risers or the like, and which can be stored in a minimum amount of space in an out-of-the-way location on a drilling vessel.

SUMMARY OF THE INVENTION

The present invention is an improvement over prior art fairings by providing fairing sections and a handling/racking system that overcome the problems of the typical time-consuming procedures for installing and removing streamlined fairing sections from a marine riser and storing them on a drilling vessel when they are not in use.

The elongated fairing sections have a front portion extending along its length and a rear portion projecting from the front portion. The rear portion includes side walls that project away from the front portion. The fairing section defines an opening adapted to fit around the marine riser.

The front portion also includes at least one door extending along the front portion, which is movable between open and closed positions for allowing the fairing section to be installed on and removed from the marine riser. A latch holds the door closed. The rear portion includes an elongated open portion shaped to receive the rear portion of another similarly-shaped fairing body when the door is open, for nesting a plurality of fairing bodies one-in-the-other.

The front portion has a generally round shape, while the rear portion includes a pair of tapered side walls extending from the front portion and terminating in a flat rear surface. The flat rear surface includes a plurality of slotted openings for receiving handling lugs connected to a handling mechanism.

The front portion preferably includes a pair of doors hinged to the fairing section, with the doors extending along the length of the fairing section which, when opened, create an space that is at least as wide as the opening that fits around the fairing body. A plurality of latching mechanisms hold the doors closed when latched.

The rear portion of the fairing section includes filler material that is either neutrally or partially buoyant. The rear portion also has a generally trapezoidal shape. The filler includes a cavity with a generally similar shape for receiving another similarly-shaped fairing section when the doors are open.

A low friction material is connected around at least a part of the surface of the fairing body defining the elongated opening. This low fiction material can be formed of strips of molydbodeum impregnated nylon, which is lubricated by sea water.

The fairing system includes a plurality of fairing sections which are capable of being nested one-in-the-other at a first stored location when their respective doors are open. These bodies can be installed one-by-one on the marine riser and held in place when the doors are closed. A handling machine is mounted on the marine vessel for moving the fairing sections between their first stored location and a second location for installing each fairing section on the marine riser.

The handling mechanism includes a telescoping arm with an outer end, and a gasping mechanism connected to the outer end for grasping individual fairing bodies. The handling mechanism further includes a moving mechanism for moving the telescoping arm from a first position where the grasping mechanism engages each fairing section at the first location, to the second position where the fairing sections are installed on the marine riser.

The handling mechanism can include a pivot for rotating the handling mechanism, and tracks for allowing the handling mechanism to move back and forth in at least one direction.

The grasping mechanism includes a plurality of handling lugs adapted to engage the fairing sections, and a stabbing guide for guiding the lugs into position relative to the fairing sections. A toggling mechanism, adapted for movement relative to the end of the telescoping arm, is provided for aligning the handling lugs with the fairing sections. The toggling mechanism includes a hydraulic cylinder and a pivot arm connected between a telescoping arm and a stabbing guide.

The fairing system also includes a storage rack for storing the fairing bodies nested one-in-the-other when not in use.

The storage rack includes a plurality of support beams, a trolley movable along the support beams for each fairing section and a connection mechanism between each trolley and fairing section for holding the fairing section in place on the storage rack and moving it into a position where it can be engaged by a grasping mechanism. The connecting mechanism includes a sling connected to each trolley and a pin connected to each sling for engagement with an opening formed in the fairing section.

The method for installing and removing the fairing sections includes the steps of (1) storing the bodies in a storage area by nesting them one-in-the-other on a drilling vessel with their doors open; (2) moving the fairing sections one-at-a-time from the storage area to the marine riser, with the doors open, by use of a handling mechanism; (3) securing each fairing section to the riser by latching the door section in a closed position; (4) disengaging the handling mechanism from the fairing section after it is secured to the marine riser, and (5) moving the handling mechanism to grasp the next fairing section at the storage area and repeating the procedure until the desired number of fairing sections have been installed.

BRIEF DESCRIPTION OF THE DRAWINGS

For a better understanding of the present invention, reference should be had to the following detailed description, taken in conjunction with the accompanying drawings, in which like parts are given like reference numerals:

FIG. 4 is a rear elevational view of the preferred embodiment of a fairing section;

FIG. 5 is a side elevational view of the fairing section of FIG. 4;

FIG. 6 is a front elevational view of the fairing section of FIGS. 4 and 5;

FIG. 7 is a top plan view of a number of fairing sections, nested one-in-the-other for storage, where the door panels are open;

FIG. 8 is a top plan view of one of the fairing sections with its door panels closed;

DETAILED DESCRIPTION OF THE PREFERRED EMBODIMENTS

Figure 1:
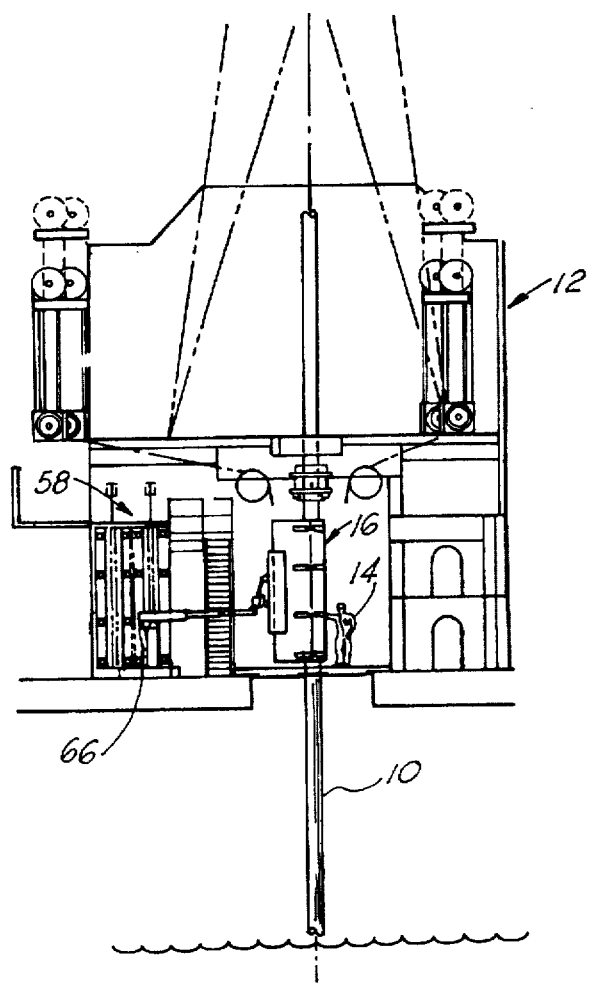
FIG. 1 is an elevational view of a preferred embodiment of the apparatus of the present invention and shows a fairing section being installed on a marine riser.

FIGS. 1–10 illustrate preferred embodiments of the fairing and handling system and method of the present invention. The fairing system includes a unique design for streamlined fairing sections designed to be installed on a marine riser 10 that extends from a drilling vessel, generally designated by reference numeral 12, to a wellhead (not shown) on the ocean floor. The unique handling system and method involves the installation, removal and storage of the fairing sections.

Drilling or marine risers are well known. They include a conduit for returning drilling fluids and cuttings from an underwater well and for well gas that may need to be diverted in well-controlled operations. A drill string (not shown) is contained within the riser.

Risers are typically tensioned at the top and connected to a drilling vessel by way of a telescoping slip joint (not shown). The slip joint permits the drilling vessel 12 to move relative to the riser 10 in response to wave and current action.

In operation, the riser 10 is affected and stressed by its own weight, its top tension, the weight of the drilling fluid, the wave and current action in the water, and movement of the drilling vessel. In particular, wave and current actions create relatively high drag forces and vortex-induced vibrations (VIV) that can over-stress and damage the riser 10 and result in excessive riser angles at top and bottom, which may create unsafe drilling conditions.

The invention is directed to a unique fairing system that includes fairing sections designed to reduce drag forces and VIV on structures such as marine risers, and a handling system and method for quickly and easily installing and removing the fairing sections, and storing them in an out-of-the-way location on the drilling vessel when they are not in use.

Figure 3:
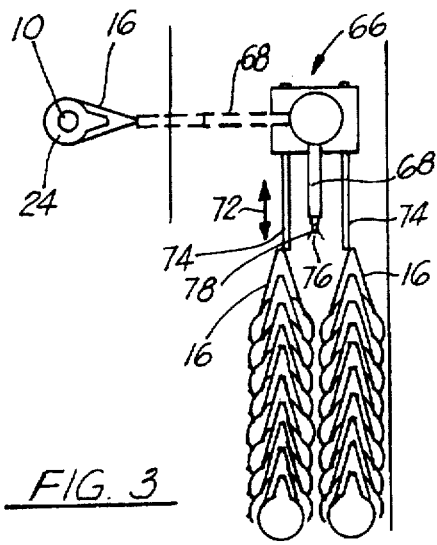
FIG. 3 is a top schematic fragmentary view of the preferred embodiment of the storage rack of FIG. 2, illustrating positions of a telescoping arm of the handling mechanism adjacent the storage rack (solid lines) and adjacent the riser (broken lines)
Figure 2:
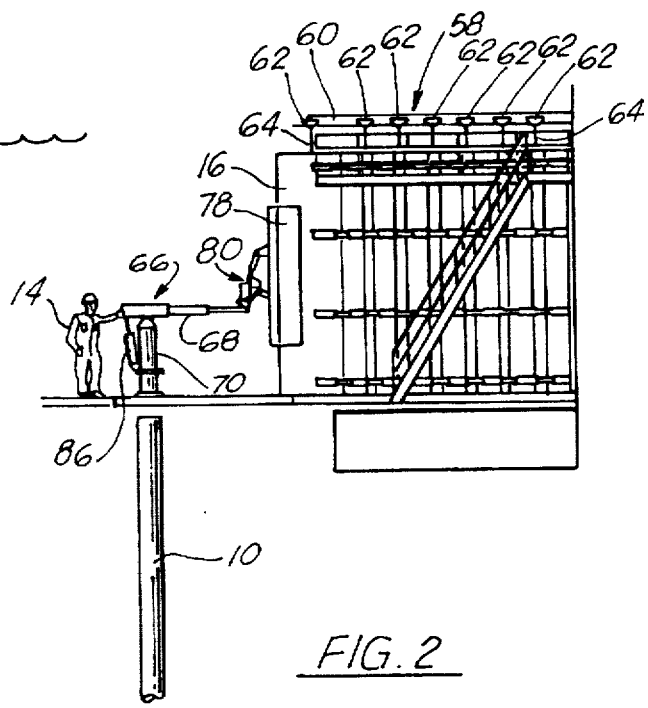
FIG. 2 is a fragmentary view of the preferred embodiment of FIG. 1 illustrating removal of a fairing section from a storage rack for the fairing sections.
Figure 9:
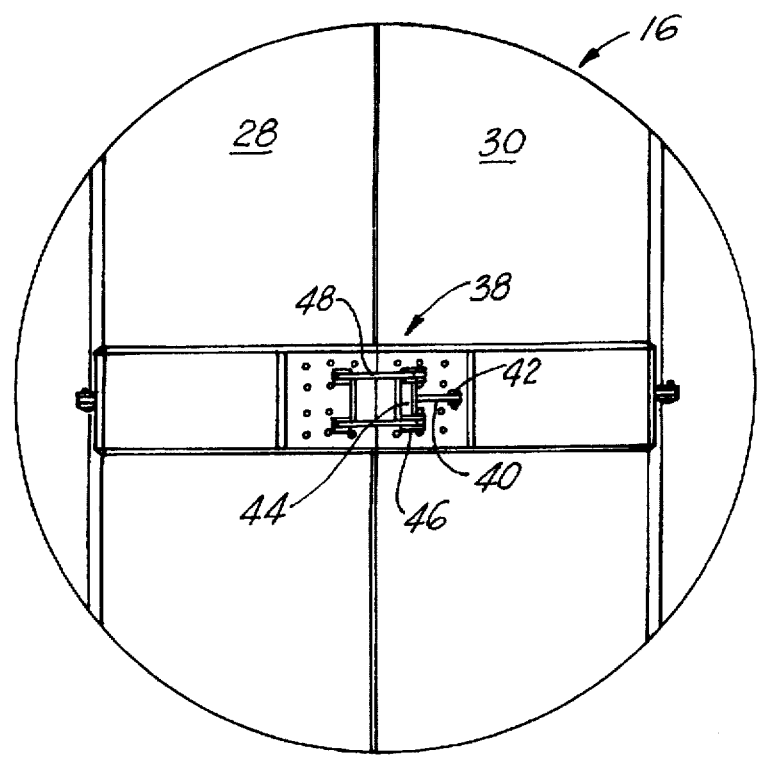
FIG. 9 is a partial elevational view of a fairing section showing in particular the latching mechanism for the door panels.
Figure 10:
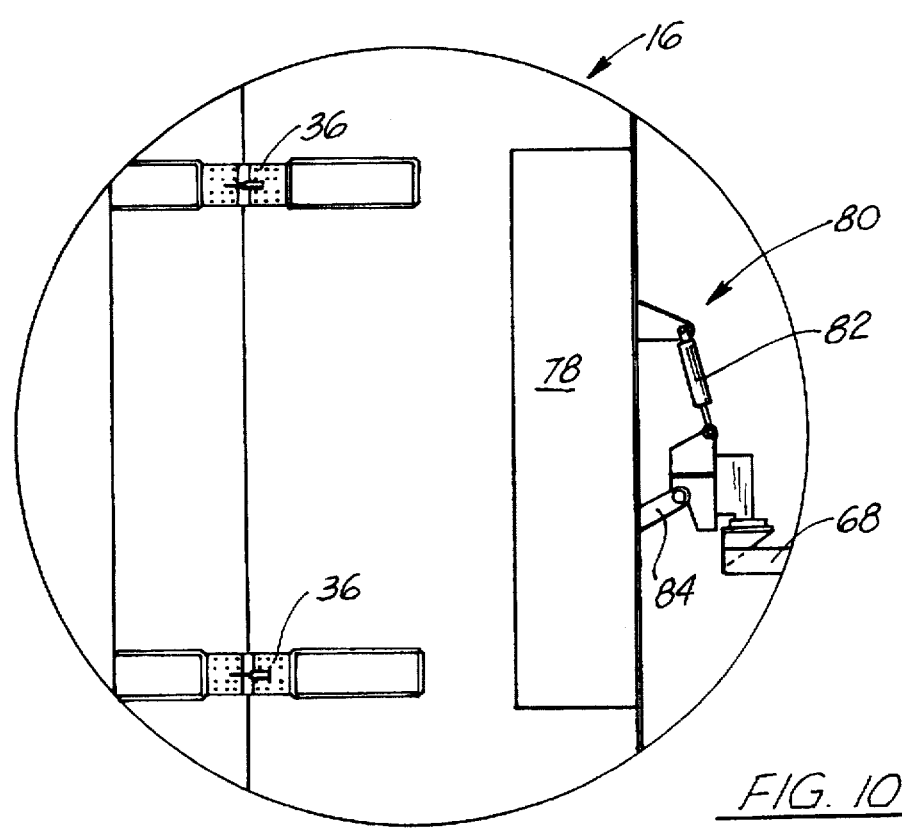
FIG. 10 is a partial elevational view of a fairing section showing in particular the hinges used to connect the door panels to the fairing body and the mechanism mounted on the end of the telescoping arm for grasping the fairing sections so they can be installed on or removed from a marine riser.

FIGS. 1–3 generally show the system of the present invention in detail. In FIG. 1, a worker 14 is shown installing one of the fairing sections 16 on the marine riser 10. The fairing sections 16 are installed as the riser sections are run to the subsea well (not shown).

It is contemplated that three fairing sections 16 can be installed on each riser section so that, for example, for a 60-foot long riser section, three 20-foot long fairing sections 16 will be used.

The structure of each fairing section 16 is shown in detail in FIGS. 4–8. As shown best in FIG. 8, the fairing section 16 has a rounded front or nose portion 18 and a tapered or back portion 20, which together provide a streamlined profile. An opening 22 is defined by the fairing section 16 for fitting around buoyancy modules typically mounted on marine risers, which are generally designated by reference numeral 24 as shown in FIG. 3. Typically, for marine risers which have a diameter of 21 or 26 inches, buoyancy modules will have an outer diameter of about 44½ inches. The opening 22 is designed to have about the same dimension as the outer diameter of the buoyancy modules 24.

The fairing section 16 is designed so that it can freely rotate about the riser 10 in order to provide more efficient handling of the wave and current action and VIV bearing on the riser 10. The respective fairing sections 16 are not connected and can rotate relative to each other. Bands of low-friction plastic rings, preferably formed of a molybdenum impregnated nylon, generally designated reference numeral 26, are connected to the inside surface of the portion of the fairing section 16 that defines the opening 22. Molybdenum impregnated nylon is advantageous because a useful lubricant for that material is sea water. Rings about 3 inches wide can be connected at the top, bottom and middle portion of the fairing section 16.

As shown best in FIG. 7, the fairing section 16 also includes a pair of door panels 28, 30, which are movable between an opened position shown in FIG. 7 for allowing the fairing section 16 to be installed on the riser 10 and a closed position shown in FIG. 8 for holding the fairing sections 16 in place on the riser 10. The doors 28, 30 are connected to side panels 32, 34, respectively, through hinges 36 shown in detail in FIG. 5, for allowing the doors 28, 30 to pivot relative to the panels 32, 34, respectively and open and close.

The doors 28, 30 are latched by double, cam-type hinge clamps 38 connected to the fairing section 16. The hinge clamp 38 is shown in detail in FIG. 9, where a latch arm 40, which is held in place by a pin 42 when the hinge clamp 38 is closed, as shown, is connected to a cam 44. When the pin 42 is removed and the latch arm 40 is raised, the cam 44 is rotated and released from a holding mechanism generally designated by reference numeral 46. Arms 48 on which the cam 44 is mounted, are pivotally connected to the door section 28 so that when the hinge clamp 38 is unlatched, the cam 44 is disconnected from the holding mechanism 46 to allow the doors to move to their opened position shown in FIG. 7. As shown in FIG. 6, four hinge clamps 38 are spaced along the length of the fairing section 16.

The principal material used in constructing the fairing section 16 is Fiberglass, with plastic and stainless steel fittings for the hinges 36 and hinge clamp 38. Other known materials can also be used which have suitable weight, strength and corrosion-resistant characteristics.

The tail portion 20 of the fairing section 16 has a flat rear surface 50, shown best in FIGS. 4 and 8, resulting in the tail portion 20 having a truncated pyramid shape. The surface 50 includes a pair of attachment receptacles in the form of slotted openings 52 for engagement by a handling mechanism described in detail below.

The tail portion 20 of each fairing section 16 is partially filled with a known syntactic foam material 54 for making the fairing section 16 partially buoyant in sea water. This foam material can be positively buoyant or neutrally buoyant for achieving the desired results.

As shown best in FIGS. 3 and 7, the fairing sections 16 are designed so they can be nested one-in-the-other for compact storage on the drilling vessel 12. This nesting is accomplished by forming a cavity 56 in the foam material 54, which is generally trapezoidal in shape and conforms in shape to the outer surfaces of the tail section 20 of each fairing section 16. Thus, when the doors 28, 30 are in their open position as shown in FIG. 7, the fairing section 16 can be nested with the tail portion 20 of one fairing section 16 fitting in the cavity 56 of an adjacent fairing section 16.

As shown in FIGS. 1 and 2, the fairing sections 16 are stored beneath the main deck of the drilling vessel 12. In a preferred embodiment of the invention, the fairing sections 16 are mounted on a rack generally designated by reference numeral 58 (FIG. 2), which is formed of horizontal I-beams 60 suspended from the main deck of the drilling vessel 12 in a suitable manner. A number of 4-wheeled trolleys 62, one for each fairing section 16, are mounted for movement along the I-beams 60. Any suitable motorized or manual moving mechanism can be employed for moving the trolleys 62 back and forth along the I-beams 60.

A sling 64 suspends from each trolley 62. A horizontally-disposed pin (not shown) is mounted on the lower end of each sling 64 that fits within an opening, illustrated by dotted lines 65, formed in the foam filler material 54 at the upper end of each fairing section 16, for supporting and moving the fairing section 16 within the rack 58. Any other type of suitable moving and attachment mechanism can be used to achieve the same results.

When the fairing sections 16 are not in use, they are stored as shown in FIGS. 1–3 in a convenient location on the drilling vessel 12. When the fairing sections 16 are installed, a handling machine designated generally by reference numeral 66 (FIGS. 2, 3) is used. The machine 66 includes a telescoping arm 68 movable between the position shown in FIG. 3 by the solid lines where the arm 68 can be used to engage the forward-most fairing section 16, and its extendable position shown by the dotted lines to where the fairing section 16 is installed or removed from the riser 10. The telescoping arm 68 is pivotally mounted on a base 70 which, in turn, is mounted on the drilling vessel 12. The base 70 is mounted for movement in the direction of an arrow 72 on a pair of trades 74 so that the handling machine 66 is capable of retrieving the fairing sections 16 mounted on the storage system 58.

The telescoping arm 68 engages the fairing section 16 through a pair of handling lugs 76 (FIGS. 3, 7) designed to fit in the slotted openings 52. A stabbing guide 78 is mounted on the end of the telescoping arm 68 along with the handling lugs 76 for engaging the surface 50 and portions of the sidewalls 32, 34 of the tail portion 20, so the fairing section 16 can be held and transported between the rack 58 and the riser 10.

The handling lugs 76 and stabbing guide 78 are mounted on the telescoping arm 68 through a toggling mechanism generally designated by reference numeral 80 (FIG. 10), which includes a hydraulic cylinder 82 and a pivot arm 84 connected to the stabbing guide 78. The toggling mechanism 80 allows the handling lugs 76 to be easily aligned with and inserted into the slotted openings 52 as shown in FIGS. 1 and 2. While a specific embodiment of an attachment mechanism between the telescoping arm 68 and fairing sections 16 has been described, it should be understood that alternative attachment mechanisms can also be used.

As shown best in FIG. 3, the handling machine 66 is movable along the trades 74 in the direction of arrows 72 so that the handling lugs 76 can engage the slotted openings 52 for firmly grasping the fairing section 16. The telescoping arm 68 can be then pivoted to the position shown by the dotted lines in FIG. 3 and extended to move the fairing section 16 into position on the riser 10, at which time the doors 28, 30 are closed and latched. A hydraulic cylinder 86 (FIG. 2) can be provided to assist in these operations.

As described, fairing sections are provided for reducing drag forces and VIV on structures such as marine risers, which have advantages over those used in the prior art. A handling system and method were also described that can be used for quickly and easily installing and removing the fairing sections, and storing them in an out-of-the-way location on the drilling vessel.

Because many varying and different embodiments may be made within the scope of the inventive concept described above, and because many modifications may be made in the embodiments described by those skilled in the relevant art, it is to be understood that the details of the invention as described are to be interpreted as illustrative and not in a limiting sense.

What is claimed as invention is:

1. A streamlined marine fairing, comprising:
 a) an elongated fairing section adapted for assembly around an elongated marine body;
 b) the fairing section including a front portion extending along the length of the body, and a rear portion projecting from the front portion, the rear portion inducting side walls that project away from the front portion;

c) the fairing section being configured to define an opening extending along the fairing section, adapted to fit around an elongated marine body, and further including at least one door extending along the front portion movable between open and closed positions for allowing the fairing section to be installed on and removed from the marine body when the door is in its open position;

d) a closure for holding the door in the closed position;

e) the rear portion including an internal, elongated open portion shaped to receive the rear portion of another similarly-shaped fairing section when the door is in the open position for nesting a plurality of fairing sections one-in-the-other.

2. The marine fairing of claim 1, wherein the front portion has a generally round shape.

3. The marine section of claim 1, wherein the rear portion includes a pair of tapered side walls extending from the front portion and terminating at a flat rear surface.

4. The marine fairing of claim 3, wherein the flat rear surface includes a plurality of attachment receptacles.

5. The marine fairing of claim 1, wherein the front portion includes a pair of doors hingedly connected to the fairing section, the doors including edges expending midway along the front portion when the doors are closed, the doors extending along the length of the fairing body and movable between opened and closed positions, the doors when open creating a space between their respective edges that is at least as wide as the opening extending along the fairing section.

6. The marine fairing of claim 5, wherein the fairing section further includes a plurality of latch mechanisms for holding the doors closed when the latch mechanisms are latched.

7. The marine fairing of claim 1, wherein the rear portion includes filler material that is either neutrally or partially buoyant.

8. The marine fairing claim 7, wherein the rear portion of the fairing section has a generally trapezoidal shape, and the filler material includes a cavity with a generally similar shape for receiving another similarly-shaped fairing section within the cavity.

9. The marine fairing of claim 8, wherein the opening is formed within the fairing section when the doors are in their closed position.

10. The marine fairing of claim 9, and further including a low friction material connected around at least part of the surface of the fairing section defining the opening.

11. The marine fairing of claim 10, wherein the low friction material includes strips of a molybdenum impregnated nylon material.

12. A fairing system for reducing hydrodynamic drag and vortex induced vibration on an elongated underwater body, comprising:

(a) a plurality of fairing sections as set forth in claim 1, which are capable of being nested one-in-the-other at a first stored location on a marine vessel when their respective doors are open, and which can be installed one-by-one on the elongated underwater body and held in place when their respective doors are closed.

13. The fairing system of claim 12, and further including a handling machine mounted on a marine vessel for moving the fairing sections between their first stored location and a second location for installing each fairing section on the underwater body.

14. The fairing system of claim 13, wherein the handling mechanism includes a pivot for rotating the handling mechanism, and tracks for allowing the handling mechanism to move back and forth in at least one direction.

15. The fairing system of claim 13, wherein the handling mechanism includes a telescoping arm with an outer end, and a gasping mechanism connected to the outer end for gasping individual fairing sections, the handling mechanism further including a moving mechanism for moving the telescoping arm from a first position where the grasping mechanism can engage each fairing section at the first location to the second location where the fairing sections can be installed on the underwater body.

16. The fairing system of claim 15, wherein the grasping mechanism includes a plurality of handling lugs adapted to engage the fairing sections, and a stabbing guide for guiding the lugs into position relative to the fairing sections.

17. The fairing system of claim 16, wherein the gasping mechanism further includes a toggling mechanism adapted for movement relative to the end of the telescoping arm for aligning the handling lugs with the fairing sections.

18. The fairing system of claim 17, wherein the toggling mechanism includes a hydraulic cylinder and a pivot arm connected between the telescoping arm and stabbing guide.

19. The fairing system of claim 15, and further including a storage rack for storing the fairing sections nested one-in-the-other when not in use.

20. A fairing system of claim 19, wherein the storage rack includes a plurality of support beams, a trolley movable along the support beams for each fairing section, and a connecting mechanism between each trolley and fairing section for holding the fairing section in place on the storage rack and moving it to a position where it can be gasped by the gasping mechanism.

21. The fairing system of claim 20, wherein the connecting mechanism includes a sling connected to each trolley for supporting and moving the fairing section.

22. A method for installing a fairing system adapted to reduce hydrodynamic drag and suppress vortex induced vibration on an elongated marine body, comprising the steps of:

(a) providing a plurality of fairing sections of the type set forth in claim 1;

(b) storing the fairing sections in a storage area by nesting them one-in-the-other on a drilling vessel with their doors in a open position;

(c) moving the fairing sections one-at-a-time from the storage area to the marine body with the doors opened, by use of a handling mechanism;

(d) securing the fairing section to the marine body by latching the door in a closed position;

(e) disengaging the handling mechanism from the fairing section after the fairing section is secured to the marine body; and (f) moving the handling mechanism to grasp the next fairing section at the storage area and repeating steps (c)–(e) until the desired number of fairing sections have been installed on the marine body.

23. The method of claim 22, and further including removing the fairing sections one-at-a-time from the marine body by unlatching the door and moving them for storage to the storage area by use of a handling mechanism.

* * * * *